(12) United States Patent
Leland et al.

(10) Patent No.: US 8,318,016 B1
(45) Date of Patent: Nov. 27, 2012

(54) ORBITAL WASTEWATER TREATMENT SYSTEM, METHOD OF OPERATING SAME, AND KIT FOR MODIFYING AN ORBITAL WASTEWATER TREATMENT SYSTEM

(75) Inventors: Thomas W. Leland, Salt Lake City, UT (US); Frederick M. Riser, Salt Lake City, UT (US); Peter W. Reko, Park City, UT (US)

(73) Assignee: Ovivo Luxembourg S.A.R.L., Munsbach (LU)

( * ) Notice: Subject to any disclaimer, the term of this patent is extended or adjusted under 35 U.S.C. 154(b) by 323 days.

(21) Appl. No.: 12/660,206

(22) Filed: Feb. 22, 2010

Related U.S. Application Data

(63) Continuation-in-part of application No. 12/321,381, filed on Jan. 16, 2009, now Pat. No. 8,057,674.

(60) Provisional application No. 61/208,446, filed on Feb. 23, 2009.

(51) Int. Cl.
   *C02F 3/00* (2006.01)
(52) U.S. Cl. ........ 210/607; 210/621; 210/629; 210/739; 210/138; 210/143; 210/194; 210/926
(58) Field of Classification Search .................. 210/607, 210/621, 629, 739, 138, 143, 194, 926
See application file for complete search history.

(56) References Cited

U.S. PATENT DOCUMENTS

| | | | | |
|---|---|---|---|---|
| 3,510,110 | A * | 5/1970 | Klein | 210/220 |
| 3,964,998 | A * | 6/1976 | Barnard | 210/605 |
| 4,159,243 | A * | 6/1979 | Okey | 210/629 |
| 4,285,818 | A * | 8/1981 | Muskat | 210/614 |
| 4,303,516 | A * | 12/1981 | Stensel et al. | 210/195.4 |
| 4,383,922 | A * | 5/1983 | Beard | 210/521 |
| 4,548,712 | A * | 10/1985 | Reid | 210/194 |
| 4,818,391 | A * | 4/1989 | Love | 210/195.3 |
| 4,869,818 | A * | 9/1989 | DiGregorio et al. | 210/194 |
| 4,940,545 | A * | 7/1990 | DiGregorio et al. | 210/609 |
| 4,950,406 | A * | 8/1990 | Beard et al. | 210/521 |
| 4,975,197 | A * | 12/1990 | Wittmann et al. | 210/626 |
| 5,234,595 | A * | 8/1993 | DiGregorio et al. | 210/605 |
| 5,552,319 | A * | 9/1996 | Yang et al. | 435/286.5 |
| 7,001,516 | B1 * | 2/2006 | Hong et al. | 210/260 |
| 7,186,332 | B2 * | 3/2007 | Curtis et al. | 210/150 |

\* cited by examiner

*Primary Examiner* — Chester Barry
(74) *Attorney, Agent, or Firm* — R. Neil Sudol; Coleman Sudol Sapone P.C.

(57) ABSTRACT

An orbital wastewater treatment system includes a tank assembly, at least one impeller, a flow-diversion mechanism, an actuator, optionally at least one sensor disposed in the tank assembly, and a control unit. The tank assembly has an anoxic zone and an aerobic zone and passages between the two zones. The impeller is disposed in the tank assembly for aeration and for moving mixed liquor under process about the tank assembly. The flow-diversion mechanism is disposed at at least one of the passages between the aerobic and the anoxic zone. The actuator is operatively connected to the gate for regulating the flow state or configuration thereof in response to a signal generated by the control unit at least partially pursuant to a predetermined schedule and/or at least partially in accordance with input from the sensor.

30 Claims, 4 Drawing Sheets

ORBITAL WASTEWATER TREATMENT SYSTEM, METHOD OF OPERATING SAME, AND KIT FOR MODIFYING AN ORBITAL WASTEWATER TREATMENT SYSTEM

CROSS-REFERENCE TO RELATED APPLICATIONS

This application is a continuation-in-part of application Ser. No. 12/321,381 filed 16 Jan. 2009, U.S. Pat. No. 8,057,674. This application also claims the benefit of U.S. Provisional Patent Application No. 61/208,446 filed 23 Feb. 2009.

BACKGROUND OF THE INVENTION

This invention relates to an orbital wastewater treatment system. This invention also relates to an associated method of operating an orbital wastewater treatment system and to a kit for modifying an existing orbital wastewater treatment system.

In a wastewater process employing an activated sludge process, wastewater impurities including domestic wastes, sugars, lipids, proteins, carbohydrates and other nitrogen- and phosphorous-containing materials are decomposable by microorganisms, as is well known in the art. As the impurities are decomposed, a sludge of settled material and microorganisms is wasted from the process either on a continuous or non-continuous basis. The purpose of sludge wasting is to keep solids from building up in the system. Sludge from the process is normally transported by pumping to a digester for treatment prior to landfill or other disposal so as to reduce the volatile organic content of the sludge, reduce the sludge volume, reduce the pathogenic organisms present in the sludge, reduce its odor potential and improve sludge dewaterability, and for other reasons of lesser importance. Various prior art types of digesters and various digestion and stabilization processes have been proposed and used.

An early circa 1960 installation by Pasveer for wastewater, i.e. primarily sewage, purification by the activated biological sludge method included a closed circuit or ditch with a horizontally-rotated brush rotor used for adding needed oxygen (air) to the sewage and moving the sewage in circulation. In U.S. Pat. No. 3,510,110, an orbital system employing an elongated tank with central partition was disclosed which employed a vertically-rotated surface aerator located at the end(s) of the partition wall for both aerating the sewage and circulating the sewage around the channels formed by the partition wall and the sides of the tank. This latter system has had great commercial success with over 1000 plants in operation world-wide (ranging from less than 1 MGD capacity to one of over 10 million population equivalent) with over 600 plants in operation or in various construction phases since 1976 in the United States up to the present time. Sold under the trademark "Carrousel®", the high popularity of the system is due primarily to its cost-effectiveness, simplicity of design, ease of operation and maintenance, and excellent effluent quality. It can treat raw domestic water to EPA advanced secondary standards without primary clarifiers or effluent filters. With extended aeration, it produces a highly stable water sludge requiring little or no further processing prior to disposal. Carrousel® orbital wastewater treatment systems can be designed to have a power turn-down of 50 to 85 or 90%. Aerator drive horsepower can be varied from 100% of installed capacity to as little as 10% without loss of mixing and continuing sufficient mixed liquor channel velocity. This power turn-down flexibility provides an ability to closely match oxygen input to the mixed liquor to oxygen demand of the microbes acting to degrade the sewage, without loss of mixing and movement. In one of the largest U.S. installations, over 25 MGD of sewage is treated in four units having twenty aerators utilized to aerate and circulate sewage through twenty-four channels formed by twenty partitions and exterior encircling concrete walls forming four tanks.

Improvements in Carrousel® orbital wastewater treatment systems are disclosed in U.S. Pat. No. 4,869,818, U.S. Pat. No. 4,940,545 and U.S. Pat. No. 7,186,332. In general, each Carrousel® orbital wastewater treatment system sold under the trademark denitIR® includes a tank having at least one partition that defines an anoxic zone and an aerobic zone that are operated in accordance with the modified Ludzack-Ettinger (MLE) Process. The partition also defines passages from said aerobic zone to said anoxic zone and from said anoxic zone to said aerobic zone. At least one impeller/aerator is located in said tank for moving mixed liquor under process about said tank and for increasing the dissolved oxygen content of the liquor in the aerobic zone. A manually adjustable flow-diversion gate is provided at the passage for controlling the recycling of nitrates to the anoxic zone from the aerobic zone. The aerator is efficient in oxygen transfer and mixing so as to maintain solids in suspension while varying oxygen input so that the main channel flow reaches an anoxic condition as it passes the flow-diversion gate. In the anoxic basin or zone, screened and degritted influent and recycled activated sludge are mixed with nitrified mixed liquor, providing optimized conditions for high rate denitrification, pursuant to the MLE Process. Bacteria feed on the carbon-rich influent, using molecular oxygen from the abundant nitrate to drive metabolic reactions. Nitrate is first reduced to nitrite, then to nitrogen gas, which is subsequently stripped in the aeration basin. In the process, portions of the alkalinity and oxygen consumed during nitrification are restored.

OBJECTS OF THE INVENTION

An object of the present invention is to provide an improved orbital wastewater treatment system and/or an improved method for operating an orbital wastewater treatment system.

Another object of the present invention is to provide such an improved orbital wastewater treatment system that is easier and more efficient to operate.

Yet another object of the present invention is to provide a kit for retrofitting existing orbital wastewater treatment systems or for installation in new orbital wastewater treatment systems to improve their efficiency and ease of operation.

These and other objects of the invention will be apparent from the drawings and descriptions herein. Although each of the objects of the invention is believed to be attained in at least one embodiment of the invention, there is not necessarily any one embodiment that achieves all of the objects of the invention.

SUMMARY OF THE INVENTION

An orbital wastewater treatment system in accordance with the present invention comprises a tank assembly, at least one impeller for aeration and mixing, a flow-diversion mechanism, an actuator, and a control unit. The tank assembly has at least a first treatment zone and a second treatment zone, and at least two passages between the two zones. The impeller is disposed in the tank assembly for aeration in one zone and for moving mixed liquor under process about the tank assembly. The flow-diversion mechanism is disposed at at least one of the passages between the two zones. The actuator is operatively connected to the flow-diversion mechanism for controlling the position thereof. The control unit is operatively connected to the actuator for regulating a flow state or configuration of the flow-diversion mechanism to adjust the flow of liquor between the two treatment zones pursuant to a program.

Typically, the first treatment zone is an anoxic zone that may be converted into an anaerobic zone and the second treatment zone is an aerobic zone a portion of which may be converted at least partially into an anoxic zone, depending on operating conditions.

Pursuant to another feature of the present invention, the system additionally comprises at least one sensor. The at least one sensor is disposed in the tank, and the control unit is operatively connected to the sensor and the actuator for regulating a flow state or configuration of the flow-diversion mechanism at least partially in accordance with input from the sensor.

Pursuant to a further feature of the present invention, the control unit is programmed to adjust the flow-diversion mechanism to one of two opposed extreme flow states or configurations upon an earlier to occur of (i) a lapse of a predetermined time period after adjusting of the flow-diversion mechanism from the one extreme flow state or configuration and (ii) a detection by the sensor of a predetermined magnitude of a preselected control parameter in one of the first treatment zone and the second treatment zone.

The extreme states or configurations of the flow-diversion mechanism are generally a configuration allowing maximum liquor flow and a configuration minimizing liquor flow between the two treatment zones. For example, the extreme states or configurations may be a fully opened configuration and a fully closed configuration of the flow-diversion mechanism.

The sensor is typically a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor. Accordingly, the control parameter measured by the sensor is typically a phosphorus concentration (as in phosphorous acid), an oxidation reduction potential, an NADH concentration, an $NO_3$—N concentration, an ammonia concentration, a dissolved oxygen concentration, or a mixed liquor velocity (ft/sec).

In one specific embodiment of the present invention, where the first treatment zone is an anoxic/anaerobic zone and the second treatment zone is an aerobic/anoxic zone, the one extreme state or configuration is an at least partially closed configuration at least partially blocking liquor flow from the second zone to the first zone during an anaerobic treatment phase in the first zone. In this one specific embodiment, the one sensor may be a nitrate sensor disposed in the second treatment zone (aerobic/anoxic), with the control unit being programmed to at least partially close the flow-diversion mechanism, and at least inhibit mixed liquor flow from the second treatment zone to the first treatment zone, in response to detection via the sensor of a drop in nitrate content to a predetermined level. Optionally, the control unit is programmed to substantially close the flow-diversion mechanism, thereby substantially preventing liquor flow from the second zone to the first zone, in response to detection via the sensor of a drop in nitrate content in the second zone to a predetermined level.

A second sensor may be disposed in the first treatment zone, for example, a phosphorous, ORP, or NADH sensor, with the control unit being programmed to at least partially open the flow-diversion mechanism and allow mixed liquor flow from the second treatment zone to the first treatment zone in response to detection via the sensor of a change in the measured parameter. Generally, at least some flow exists at all times from the first treatment zone to the second treatment zone.

The control unit may be further programmed to periodically and incrementally adjust the flow-diversion mechanism based on values of one or more parameters as detected by the sensor(s).

According to an additional or alternative feature of the present invention, the control unit is programmed to maintain the flow-diversion mechanism in one extreme state or configuration (e.g., closed) for a predetermined time period and to adjust the flow-diversion mechanism from that one extreme state or configuration after termination of the predetermined time period. More generally, the control unit may be programmed to adjust the flow state or configuration of the flow-diversion mechanism at least partially in accordance with a predetermined schedule of operation.

The control unit may be also programmed to adjust the flow-diversion mechanism from the one extreme state or configuration upon an earlier to occur of (i) a lapse of the predetermined time period after adjusting of the flow-diversion mechanism to the one extreme state or configuration and (ii) an automated detection of a predetermined magnitude of a preselected control parameter in one of the first treatment zone and the second treatment zone. Accordingly, control of the flow state or configuration of the flow-diversion mechanism may be based on both a schedule and on sensor input.

According to an optional feature of the present invention, where the system includes at least one input conduit extending to the tank for delivering recycled activated sludge and influent to the first treatment zone, an additional flow-diversion mechanism may be operatively connected to the control unit for regulating flow of recycled activated sludge and influent to the first treatment zone at least partially in accordance with input from the sensor. Where the first treatment zone includes a first stage and a second stage, the input conduit may include a first branch extending to the first stage and a second branch extending to the second stage. In that case, the control unit is programmed to direct incoming influent and recycled activated sludge alternately to the first stage and the second stage at least partially in accordance with input from the sensor.

According to yet another feature of the present invention, an additional sensor may be disposed in one of the first treatment zone and the second treatment zone, the additional sensor also being connected to the control unit for informing control operations thereof. The additional sensor may be a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor.

A mixer is generally disposed in the first treatment zone. The control unit may be connected to the mixer for activating the mixer upon an opening of the flow-diversion mechanism and for turning off the mixer upon a closing of the flow-diversion mechanism.

A tank assembly incorporating the present invention may include one or more selector basins upstream of the first treatment zone. The at least one selector basin receives influent and communicates with the first treatment zone. At least one sensor may be disposed in the at least one selector basin, the control unit being operatively connected to the sensor and the actuator for regulating or adjusting a flow state or configuration of the flow-diversion mechanism at least partially in accordance with input from the sensor.

To provide storm flow protection where a mixer is disposed in the first treatment zone, at least one flow rate sensor is provided for measuring rate of influent flow into the first treatment zone. The control unit is operatively connected to the mixer and the influent flow rate sensor sensor for deactivating or stopping the mixer upon detecting an influent flow rate in excess of a predetermined level. The control unit may be additionally programmed to close the gate upon detecting an influent flow rate in excess of the predetermined level.

A tank assembly incorporating the present invention may include at least one input conduit extending to the tank assembly for delivering recycled activated sludge to at least one of the first treatment zone and the second treatment zone. The delivery of the activated sludge may be regulated by the control unit in response to sensor input.

The present invention is also directed to a method for operating an orbital wastewater treatment system, the system including a tank assembly with at least a first treatment zone and a second treatment zone, the tank assembly including at least two passages between the two zones. The method comprises energizing at least one impeller in the tank to aerate and move mixed liquor about the tank assembly, and automatically adjusting a flow-diversion mechanism at at least one of the passages to adjust or vary the rate of flow of liquor between the two treatment zones.

The method may further comprise automatically operating a sensor at a given location in the tank assembly, the automatic adjusting of the flow-diversion mechanism being implemented at least partially in accordance with an output of the sensor. The sensor may be a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor.

In accordance with a further feature of the present invention, the adjusting of the flow-diversion mechanism includes adjusting the flow-diversion mechanism to one of two opposed extreme states or configurations upon an earlier to occur of (i) a lapse of a predetermined time period after adjusting of the flow-diversion mechanism from the one extreme state or configuration and (ii) a detection by the sensor of a predetermined magnitude of a control parameter in one of the first treatment zone and the second treatment zone. Where the sensor is a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor, the control parameter is a phosphorus concentration, an oxidation reduction potential, NADH concentration, a nitrate concentration, an ammonia concentration, a dissolved oxygen concentration, or a velocity, respectively.

In accordance with another feature of the present invention, the adjusting of the flow-diversion mechanism includes maintaining the flow-diversion mechanism in the one of the two opposed extreme states or configurations for a predetermined additional time period and adjusting the flow-diversion mechanism from the one of the two opposed extreme states or configurations after termination of the additional time period.

The adjusting of the flow-diversion mechanism may also include periodically and incrementally adjusting the flow-diversion mechanism, for instance, from a partially open position to a fully closed position.

The adjusting of the flow-diversion mechanism may further include adjusting the flow-diversion mechanism from the one of the two opposed extreme states or configurations upon an earlier to occur of (i) a lapse of a predetermined additional time period after adjusting of the flow-diversion mechanism to the one of the two opposed extreme states or configurations and (ii) an automated detection of a predetermined magnitude of a preselected control parameter in one of the first treatment zone and the second treatment zone.

Where the first treatment zone is an anoxic zone convertible into an anaerobic zone and the second treatment zone is an aerobic zone partially convertible into an anoxic zone, the one of the two opposed extreme states or configurations is a closed or partially closed state or configuration inhibiting or preventing flow between the first treatment zone and the second treatment zone.

Where recycled activated sludge and influent is delivered to the first treatment zone (e.g., an anoxic/anaerobic zone), the method may, but need not, include automatically regulating flow of recycled activated sludge and influent to the anoxic/anaerobic zone at least partially in accordance with a detected magnitude of the control parameter at the given location in the tank assembly. Where the anoxic/anaerobic zone includes at least a first stage and a second stage, the regulating of flow of recycled activated sludge and influent to the anoxic/anaerobic zone may include directing incoming influent and recycled activated sludge alternately to the first stage and the second stage at least partially in accordance with the detected magnitude of the control parameter.

The present invention is additionally directed to a kit (a coordinated collection of components) for modifying a new orbital wastewater treatment tank assembly or retrofitting an existing orbital wastewater treatment tank assembly having at least a first treatment zone (e.g., an anoxic/anaerobic zone) and a second treatment zone (e.g., an aerobic/anoxic zone), and at least two passages between the two zones. The kit comprises at least one actuator operatively connectable to a flow-diversion mechanism disposed in the tank assembly at at least one passage between the zones, and a control unit operatively connectable to the actuator for regulating a position or operating state of the flow-diversion mechanism.

Pursuant to another feature of the invention, the kit may additionally include at least one sensor disposable in the tank assembly, the control unit operatively being connectable to the sensor and the actuator for regulating a position of the flow-diversion mechanism at least partially in accordance with input from the sensor. The sensor may be a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, or a velocity sensor.

The control unit of the kit may be programmed to adjust the flow-diversion mechanism to one of two opposed extreme flow states or configurations upon an earlier to occur of (i) a lapse of a predetermined time period after moving of the flow-diversion mechanism from the one extreme state or configuration and (ii) a detection by the sensor of a predetermined magnitude of a control parameter in one of the first treatment zone and the second treatment zone.

The kit's control unit may be further programmed to maintain the flow-diversion mechanism in the one of the two opposed extreme states or configurations for a predetermined additional time period and adjust the flow-diversion mechanism from the one of the two opposed extreme states or configurations after termination of the additional time period.

The kit's control unit may be additionally programmed to periodically and incrementally adjust the flow-diversion mechanism. More generally, the kit's control unit may be programmed to adjust the flow state or configuration of the flow-diversion mechanism in accordance with a predetermined schedule.

The control unit may be also programmed to adjust the flow-diversion mechanism from the one of the two opposed extreme states or configurations upon an earlier to occur of (i) a lapse of a predetermined additional time period after moving of the flow-diversion mechanism to the one of the two opposed extreme states or configurations and (ii) an automated detection of a predetermined magnitude of a preselected control parameter in one of the first treatment zone and the second treatment zone.

The control unit may be programmed as well to maintain the flow-diversion mechanism, upon a closing thereof, in a closed state or configuration for a predetermined period of time and to open the flow-diversion mechanism after termination of the period of time. The kit may include at least one additional sensor taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor. A dissolved oxygen sensor is also typically disposed in the second treatment zone realized as an aerobic zone convertible at least partially to an anoxic zone.

The kit may further comprise an additional flow-diversion mechanism operatively connectable to the control unit for regulating flow of recycled activated sludge and influent to the first treatment zone at least partially in accordance with input from the sensor.

The present invention optimizes the removal of nitrogen and/or phosphorus in an activated sludge system that incorporates an anoxic/anaerobic zone communicating with an aerobic/anoxic zone via internal recycle bypass channels or passages.

DEFINITIONS

The term "actuator" is used herein to designate any component or assembly of components that is operatively connected to a flow-diversion mechanism and that is designed or adapted to move the flow-diversion mechanism from one position or configuration to another in response to signals from a control unit. An actuator as used in the present invention may take any suitable form including but not limited to a motor, a hydraulic or pneumatic cylinder, and a magnetic device.

The term "control unit" is used herein to designate a component that can control the operation of an actuator in accordance with a predetermined schedule or program. A control unit as used in the present invention may take any suitable form including but not limited to a programmed or programmable microprocessor, a hard-wired circuit, a transponder, and a numerical control unit.

The term "treatment zone" as used herein refers to a defined volume that contains slurry to be processed. The volume may be defined in any appropriate manner, including but not limited to, a dedicated tank, a partitioned-off region of a larger tank, a pool, a pit, a region defined by fluid momentum as in a whirlpool or circulating tank. Two or more treatment zones in a tank assembly in accordance with the invention may be located in different tanks, while the passages through which mixed liquor flows between two treatment zones may be external conveyances such as open channels, pipes or conduits. Mixed liquor flow through the pipes or conduits may be implemented or augmented by pumping.

The term "flow-diversion mechanism" is used herein to denote any element or assembly that enables adjustment of the rate of mixed-liquor flow through a passage or channel or along a flow path between different treatment zones. A flow-diversion mechanism as used in the present invention may take any suitable form including but not limited to a pivoting gate as described below, or a sliding gate, or a valve in a passage such as a pipe or conduit extending between two treatment zones.

The term "sensor" as used herein refers to any element that is sensitive to a chemical or physical parameter and can provide an electrical, mechanical, chemical or biochemical signal that indicates a change in a level of a targeted or sensed chemical or physical parameter. A sensor as used in the present invention may take any suitable form including but not limited to a nitrate sensor, a dissolved oxygen sensor, an ammonia sensor, an ORP sensor, an NADH (dihydride nicotinamide andenine dinucleotide) sensor, an orthophosphate sensor, and a velocity sensor.

DETAILED DESCRIPTION

Figure 1:
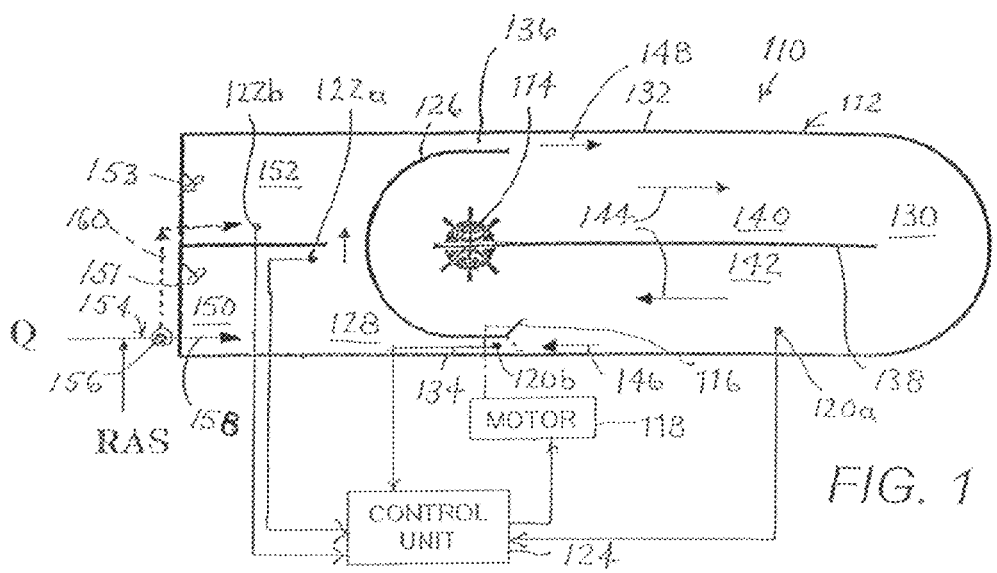
FIG. 1 is a diagram of an orbital wastewater treatment system in accordance with the present invention.

As depicted in FIG. 1, an orbital wastewater treatment system 110 comprises a tank 112, a rotary impeller/aerator 114, a flow-diversion mechanism in the form of a gate 116, an actuator in the form of a motor 118, a plurality of sensors 120a, 120b, and 122a, 122b, and a control unit 124. Tank 112 has an arcuate or semi-cylindrical partition 126 dividing the tank into a first treatment zone 128 and a second treatment zone 130. Zone 128 is typically an anoxic zone that may be converted into an anaerobic zone depending on operating conditions, while zone 130 is typically an aerobic zone that may be partially converted to an anoxic zone, again depending on operating conditions.

Partition 126 further defines, together with an external wall 132 of tank 112, a first passage 134 from aerobic/anoxic zone 130 to anoxic/anaerobic zone 128 and a second passage 136 from the anoxic/anaerobic zone to the aerobic/anoxic zone. Tank 112 further includes a planar partition or wall 138 separating aerobic zone 130 into a pair of parallel track sections 140 and 142. As indicated by arrows 144, impeller/aerator 114 propels or moves an oxygenated wastewater slurry or mixed liquor about an oval track (not separately designated) consisting largely of track sections 140 and 142.

An arrow 146 indicates a controllably intermittent stream of mixed liquor moving through passage 134, the liquor stream being low in dissolved oxygen and high in oxidized nitrogen-containing compounds owing to a nitrification reaction within aerobic zone 130. Another arrow 148 indicates a second, possibly intermittent, stream passing from treatment zone 128 to treatment zone 130 through passage 136, this second stream being low in oxidized nitrogen-containing compounds owing to a two-stage bacteria-mediated denitrification removal reaction in anoxic/anaerobic zone 128. In addition, when zone 128 is operated intermittently as an anaerobic zone, conditions occur that promote biological phosphorous release and subsequent removal.

Flow-diversion gate 116 is disposed at passage 134 for alternately permitting and blocking (or impeding) the flow of stream 146 from aerobic/anoxic zone 130 to anoxic/anaerobic zone 128. Motor 118 is operatively connected to gate 116 for controlling the position or degree of closure thereof in response to a signal from control unit 124.

Sensor 120a is disposed in aerobic/anoxic zone 130, while sensors or detectors 122a and 122b are disposed in compartments 150 and 152 of zone 128. Sensor 120a is a nitrate sensor, a dissolved oxygen sensor, an ammonia sensor, and/or an ORP sensor while sensors 122a and 122b are nitrate sensors, NADH (dihydride nicotinamide andenine dinucleotide) sensors, orthophosphate sensors or ORP sensors. Alternatively, sensors 122a and 122b may be eliminated, with control being solely by a timer. Sensor 120b is an optional velocity sensor. Control unit 124 is operatively connected to sensors 120a, 120b, 122a, 122b (as installed) and motor 118 for regulating a position of flow-diversion gate 116 at least partially in accordance with input from the sensors.

Conventional mixers 151 and 153 are provided in stages or compartments 150 and 152 for enhancing the efficiency of the denitrification and phosphorous release processes. It is possible to alter the operating state of mixers 151 and 153 in accordance with changes in the flow state or configuration of gate 116 and/or changes in one or more sensed process parameters. Specifically, mixer 151 and/or 153 may be actuated from the on position to the off position or from the off position to the on position in accordance with a pre-determined position change of the flow diversion gate 116 or by a detection by the sensor of a predetermined magnitude of a preselected control parameter. For example, control unit 124 may be operatively to mixer 151 and/or 153 to turn the mixer (s) off when the gate 116 closes and to activate the mixer(s) with the gate opens. This synchronicity results in improved phosphorous release.

The control units of the present treatment systems, each exemplarily including a microprocessor, are programmed to move the respective flow-diversion gates to one of two opposed extreme positions upon an earlier to occur of (i) a lapse of a predetermined time period after moving of the gate from that same extreme position and (ii) a detection by one or more sensors of a predetermined magnitude of a control parameter. In the embodiment of FIG. 1, control unit 124 is programmed to move gate 116 to a fully closed position upon an earlier to occur of (i) a lapse of a predetermined time period $\Delta T_1$ (FIG. 5) after an opening of the gate from the fully closed position and (ii) a detection by one or more sensors 120a, 120b, 122a, 122b of a predetermined magnitude of a nitrate concentration, phosphorous concentration, NADH concentration, or ORP level ($\Delta T_y$).

In general, the control units of the present wastewater treatment systems may be further programmed to maintain the flow-diversion gate in the one extreme position for a predetermined additional time period $\Delta T_2$ (FIG. 5) and move the respective gate from the one extreme position after termination of the additional time period $\Delta T_2$. In the embodiment of FIG. 1, after a closing of gate 116, control unit 124 may maintain the gate in the closed position, blocking flow from aerobic/anoxic zone 130 to anoxic/anaerobic zone 128, for predetermined period of time $\Delta T_2$ and to open the gate after termination of that period of time. The predetermined period $\Delta T_2$ may vary from 15 minutes to several hours, depending on the size of tank 112, the nitrogen and phosphorous content of the mixed liquor in anoxic/anaerobic zone 128, the rate of liquor flow through the tank, etc.

Alternatively, as discussed below, control unit 124 may re-open gate 116 after detection of a predetermined set point of a control parameter (e.g., a chemical or biochemical concentration) via sensors 120a, 120b, 122a, 122b. Thus, gate 116 may be opened after a time $\Delta T$ (FIG. 5) that is shorter than the predetermined period $\Delta T_2$. Similarly, control unit 124 may close gate 116 after detection of a predetermined set point of a control parameter (e.g., a chemical or biochemical concentration) via sensors 120a, 120b, 122a, 122b. Thus, gate 116 may be closed after a time $\Delta T_y$ (FIG. 5) that is shorter than the predetermined period $\Delta T_1$.

Figure 5:
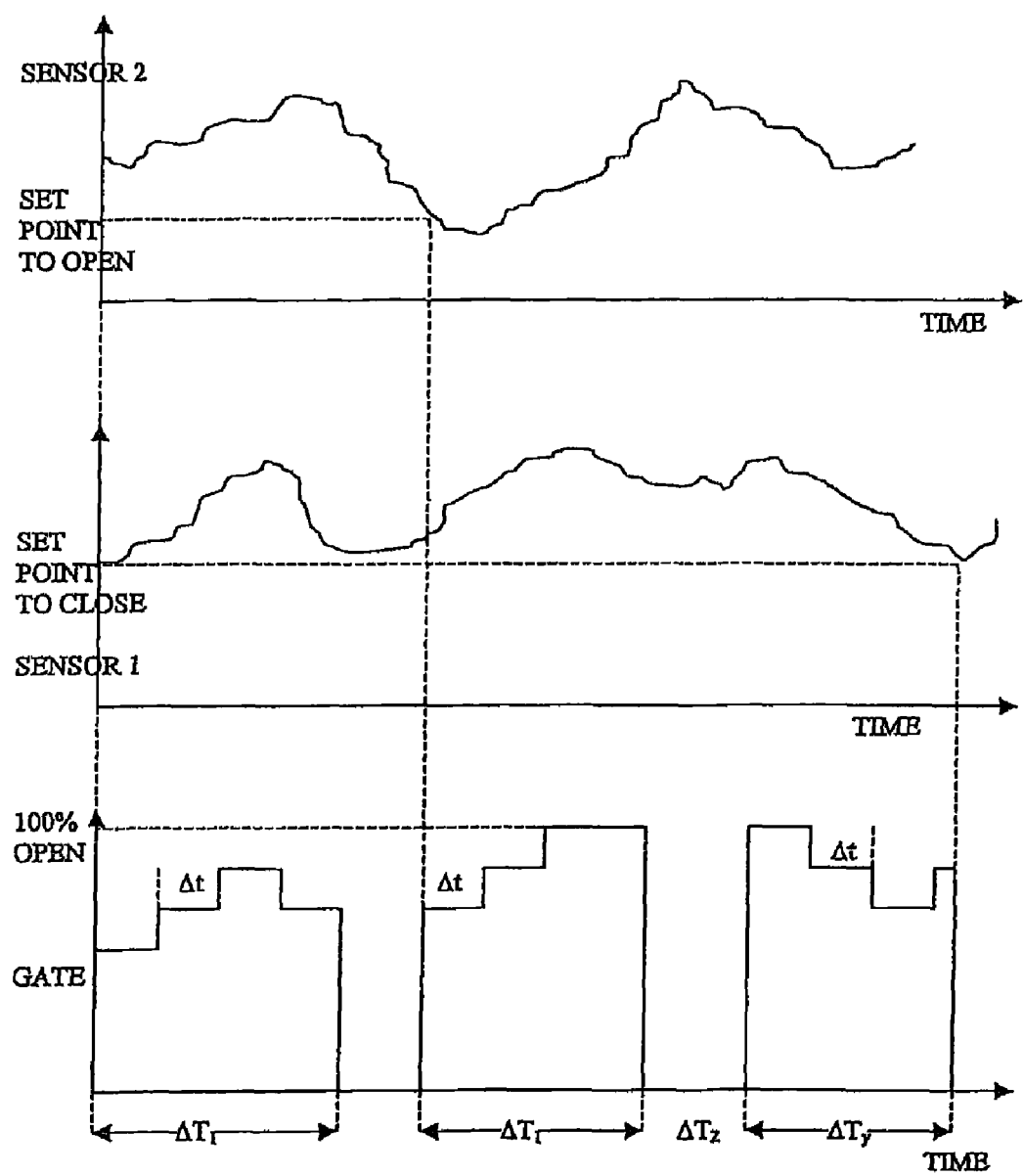
FIG. 5 is a series of three graphs schematically showing outputs of two sensors as a function of time and the position of a flow-diversion gate controlled in part in accordance with the sensors' outputs, in an orbital wastewater treatment system in accordance with the present invention.

The control units of the present wastewater treatment systems may be additionally programmed to periodically and incrementally move the respective gates, for example, in a cycle from a partially open position to a fully closed position, depending on the outputs of sensors 120a, 120b, 122a, 122b (as installed). As graphically depicted in FIG. 5, control unit 124 may move gate 116 periodically, after lapse of a time $\Delta t$, and incrementally in steps of a predetermined magnitude, from a partially open position to a fully open position and subsequently towards the fully closed position. FIG. 5 shows successive positions of gate 116, which is repositioned automatically by control unit 124 after each incremental time period $\Delta t$.

As indicated above, control unit 124 may move gate 116 to the fully closed position after lapse of a preset period $\Delta T_1$ (FIG. 5) commencing with the initial movement of the gate from the fully closed position. In a different operating scenario, control unit may open gate 116 in stepwise fashion from the fully closed position and move the gate back to the fully opened position after lapse of a preset period commencing with the initial movement of the gate from the fully closed position.

Control unit 124 may thus be programmed to move gate 116 from the fully closed position (i.e., to start opening the gate) upon an earlier to occur of (i) a lapse of the predetermined additional time period $\Delta T_2$ after moving of gate 116 to the fully closed position and (ii) an automated detection by one or more sensors 120a, 120b, 122a, 122b of a predetermined magnitude of a nitrate concentration, phosphorous concentration, NADH concentration, ORP level, or mixed liquor velocity, ammonia concentration, dissolved oxygen concentration, or a combination of predetermined magnitudes of a plurality of chemical components.

More specifically, control unit 124 is configured to at least partially close flow-diversion gate 116, and at least inhibit the flow of mixed liquor stream 146 from aerobic/anoxic zone 130 to anoxic/anaerobic zone 128, in response to detection via sensor 120a of a drop in nitrate content in aerobic/anoxic zone 130 to a predetermined level. In that case, control unit 124 is programmed to substantially close flow-diversion gate 116, thereby substantially preventing the flow of mixed liquor stream 146 from aerobic/anoxic zone 130 to anoxic/anaerobic zone 128, in response to detection via the sensor of a drop in nitrate content in the aerobic/anoxic zone.

Control unit 124 may be further programmed to adjust the position of flow-diversion gate 116 and concomitantly the rate of flow of mixed liquor stream 146 through passage 134 to anoxic/anaerobic zone 128, in accordance with further sensor input, including NADH, ORP, ammonia, dissolved oxygen or phosphate content or mixed liquor velocity as measured by sensors 120a, 120b, 122a, 122b. For example, control unit 124 may be also programmed to at least partially open flow-diversion gate 116 and allow the flow of mixed liquor stream 146 from aerobic/anoxic zone 130 to anoxic/anaerobic zone 128 in response to the detection by sensor 122a of a change in ORP, phosphorous, or NADH concentration to a predetermined level.

As shown in FIG. 1, at least one input conduit 154 extends to tank 112 for delivering recycled activated sludge RAS and influent Q to anoxic/anaerobic zone 128. Optionally, an additional gate or two-way valve 156 may be operatively connected to control unit 124 and disposed in input conduit 154 for regulating flow of recycled activated sludge RAS and influent Q to anoxic/anaerobic zone 128 at least partially in accordance with input from sensors 122a, 122b. Conduit 154 may include a first branch 158 extending to first stage 150 of anoxic/anaerobic zone 128 and a second branch 160 extending to second stage 152. Control unit 124 may be programmed in that case to direct incoming influent and recycled activated sludge alternately to stages 150 and 152 at least partially in accordance with input from sensors 122a, 122b.

The closure or substantial closure of gate 116 results in an anaerobic/fermentation environment to promote the release of phosphorous. Generally, upon the closure of flow-diversion gate 116, control unit 124 may additionally operate optional two-way valve 156 to divert incoming recycled activated sludge RAS and influent Q to downstream stage 152 of anoxic/anaerobic zone 128. To promote denitrification, two-way valve 156 and flow-diversion gate 116 are returned to their original positions feeding incoming recycled activated sludge RSA and influent Q to upstream stage 150 of anoxic/anaerobic zone 128 and permitting substantial flow of mixed liquor stream 146 from aerobic/anoxic zone 130 to anoxic/anaerobic zone 128. Cycling of the anoxic and anaerobic environments in anoxic/anaerobic zone 128 and concomitantly of flow-diversion gate 116 and two-way valve 156 is a function of the nitrate concentration and the NADH, ORP, and/or phosphorous concentration, mixed liquor velocity, and/or dissolved oxygen concentration, as measured by sensors 120a, 120b, 122a, 122b.

During operation of the orbital wastewater treatment system 110 of FIG. 1, impeller/aerator 114 is actuated or energized to move mixed liquor about tank 112 and particularly about track 140/142. During an initial part of a denitrification phase, control unit 124 maintains flow-diversion gate 116 in an open position, permitting flow of liquor stream 146 through passage 134 to anoxic/anaerobic zone 128. Control unit 124 also maintains two-way valve 156 in position to direct incoming recycled activated sludge RAS and influent Q to upstream stage 150 of anoxic/anaerobic zone 128. Control unit 124 monitors the state of denitrification in aerobic/anoxic zone 130 by means of sensor 120a. Upon detecting that nitrate levels have fallen to a predetermined low level, control unit 124 energizes motor 118 to automatically reposition flow-diversion gate 116 to close off passage 134 and operates two-way valve 156 to direct incoming recycled activated sludge RAS and influent Q to downstream stage 152 of anoxic/anaerobic zone 128. As indicated above, control unit 124 may store, in memory or an internal register, a value of a predetermined period of time and start a timer or monitor an internal clock to ascertain the elapse of that period of time after the repositioning of flow-diversion gate 116 and two-way valve 156. After the period of time has passed, control unit 124 then sets flow-diversion gate 116 back to an open position, allowing the flow of mixed liquor stream 146 from aerobic/anoxic zone 130 to anoxic/anaerobic zone 128 via passage 134. At the same time, control unit 124 resets two-way valve 156 to direct incoming recycled activated sludge RAS and influent Q to upstream stage 150 of anoxic/anaerobic zone 128.

Figure 2:
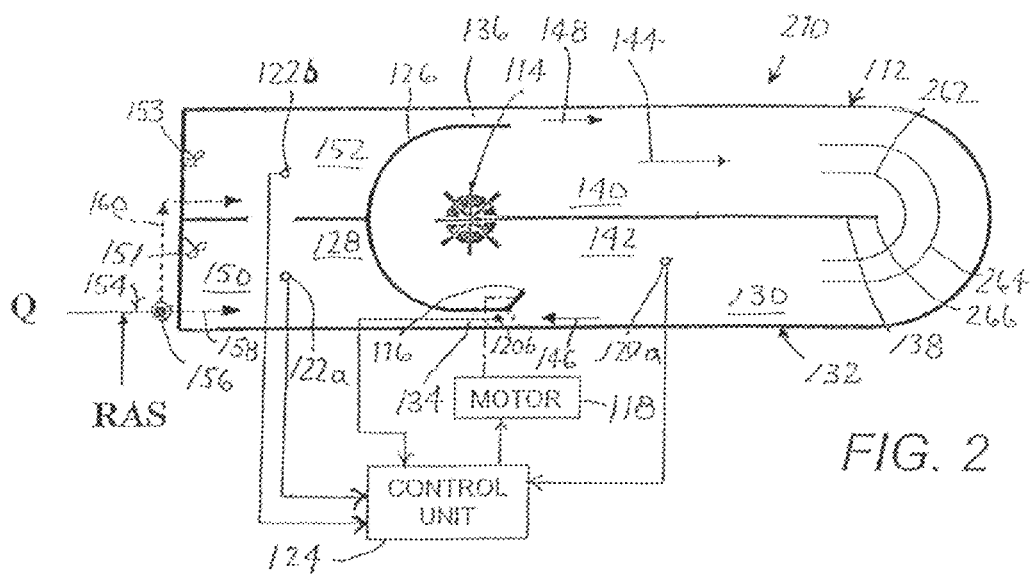
FIG. 2 is a diagram of a modification of the orbital wastewater treatment system of FIG. 1.

FIG. 2 depicts a modification 210 of the orbital wastewater treatment system of FIG. 1, wherein tank 112 includes one or a plurality of parallel baffles or vanes 262 and 264 at an end of planar partition or wall 138, serving to deflect a mixed liquor stream from track section 140 around an end 266 of partition or wall 138 to track section 142. Alternatively, another aerator (not shown) could be disposed at the end 266 of partition or wall 138, opposite impeller 114 and in place of vanes 262 and 264.

Figure 3:
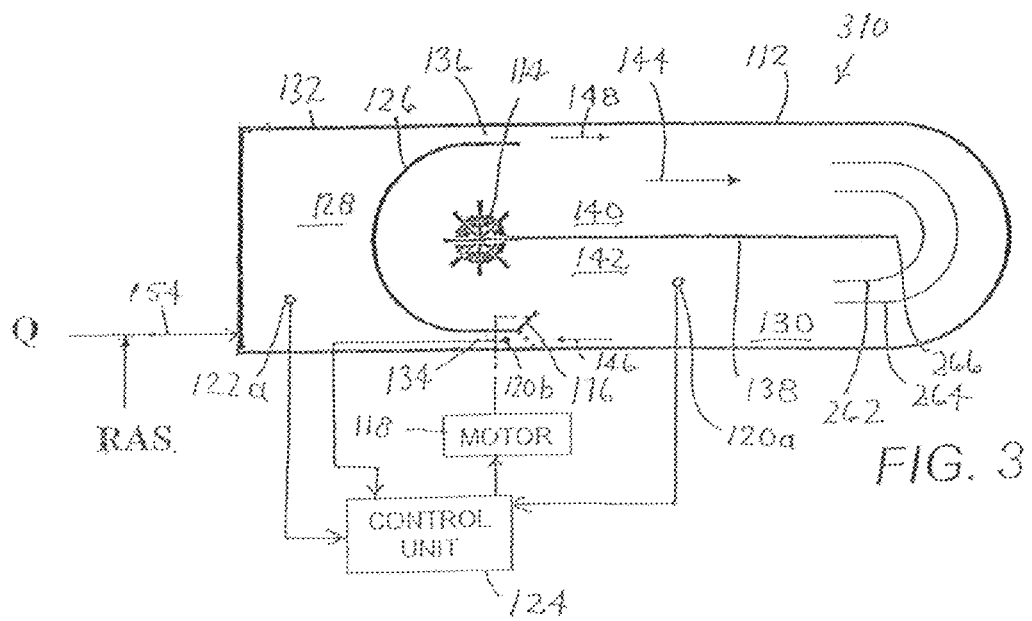
FIG. 3 is a diagram of a further modification of the orbital wastewater treatment system of FIG. 1.

FIG. 3 illustrates a modification 310 of the orbital wastewater treatment system of FIG. 2 wherein anoxic/anaerobic zone 128 comprises a single compartment (not separately labeled) and sensor 122b of FIGS. 1 and 2 is omitted. Owing to the realization of anoxic/anaerobic zone 128 as a single compartment, the modified embodiment 310 of FIG. 3 also omits mixer 153, two-way valve 156, and conduit branch 160 of the embodiments 110 and 210 of FIGS. 1 and 2. Again, another aerator (not shown) could be disposed at the end 266 of partition or wall 138, opposite impeller 114 and in place of vanes 262 and 264.

Figure 4:
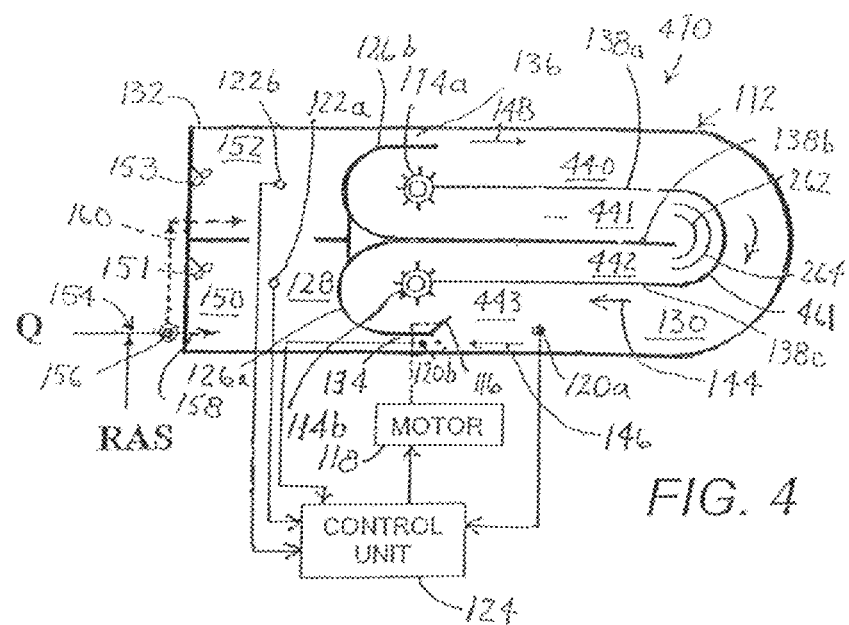
FIG. 4 is a diagram of yet another modification of the orbital wastewater treatment system of FIG. 1.

As depicted in FIG. 4, in yet another modified embodiment 410 of the orbital wastewater treatment system of FIG. 1, tank 112 includes two rotary impellers/aerators 114a and 114b and a pair of arcuate or semi-cylindrical partitions 126a and 126b together dividing the tank into an anoxic/anaerobic zone 128 and an aerobic/anoxic zone 130. Tank 112 further includes three planar partitions or walls 138a, 138b, 138c separating aerobic/anoxic zone 130 into four parallel track sections 440, 441, 442 and 443. As indicated by arrows 444, impellers/aerators 114a and 114b propel or move an oxygenated wastewater slurry or mixed liquor about a snaking track (not separately designated) consisting largely of track sections 440-443. An arcuate or cylindrical partition or wall 461 connects planar partitions or walls 138a and 138c. Baffles or vanes 262 and 264 are provided at an end of planar partition or wall 138b and serve, together with partition 461, to deflect a mixed liquor stream from track section 442 around an end of partition or wall 138b to track section 442. Another aerator (not shown) could be disposed at the end of partition or wall 138b, in place of vanes 262 and 264.

Modified embodiments 210, 310 and 410 of an orbital wastewater treatment system all have liquor flow control as discussed above with reference to FIGS. 1 and 5.

Various flow control elements of the described embodiments may be included in a kit for modifying new orbital wastewater treatment systems or retrofitting existing orbital wastewater treatment tanks. Such a kit comprises at least one actuator or motor 118 operatively connectable to a flow-diversion mechanism disposed in the tank 112 between the aerobic/anoxic zone 130 and the anoxic/anaerobic zone 128, and a control unit 124 operatively connectable to the actuator for regulating a flow state or configuration of the flow-diversion mechanism 116.

The control unit may be programmed to control the flow state or configuration of flow-diversion mechanism 116 solely in accordance with a timing schedule. Preferably, however, the kit includes one or more sensors 120a, 120b, 122a, 122b disposable in the tank 112, with the control unit 124 programmed to regulate or adjust the flow state or configuration of the flow—diversion mechanism at least partially in accordance with input from the sensor(s).

The kit typically includes a nitrate sensor 120a disposable in the aerobic/anoxic zone 130. In that event, the kit's control unit 124 is programmed to at least partially close the gate, thereby at least inhibiting mixed liquor flow from the aerobic/anoxic zone 130 to the anoxic/anaerobic zone 128, in response to detection via the sensor of a drop in nitrate content in the aerobic/anoxic zone 130 to a predetermined level. The kit's control unit 124 may be further programmed to maintain the gate 116, upon a closing thereof, in a closed position for a predetermined period of time and to open the gate after termination of the period of time.

The kit may include multiple sensors 120a, 120b, 122a, 122b connectable to the control unit 124. The sensors may include NADH, ORP, phosphorous and/or velocity sensors.

The kit may include an additional gate or two-way valve 156 that is operatively connectable to the control unit 124 for regulating flow of recycled activated sludge and influent to the anoxic/anaerobic zone 128 at least partially in accordance with input from the one or more sensors 122a, 122b. Where the anoxic/anaerobic zone 128 includes a first stage 150 and a second stage 152, the kits control unit 124 may be programmed to direct incoming influent and recycled activated sludge alternately to the first stage 150 and the second stage 152 at least partially in accordance with input from the one or more sensors 122a, 122b. The kit's control unit may be programmed to close the gate or valve 156 for predetermined time periods.

Figure 6:
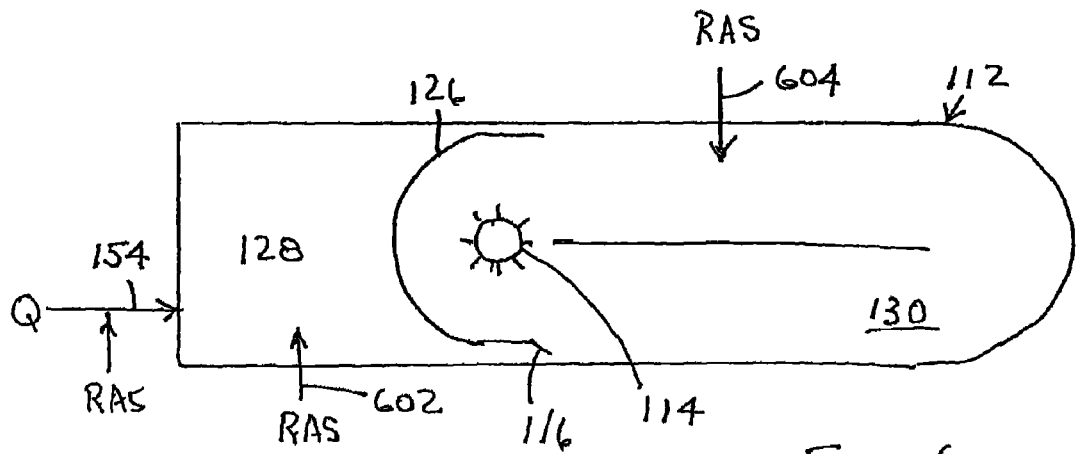
FIG. 6 is a diagram of a generic orbital wastewater treatment system in accordance with the present invention, showing alternative or supplemental locations for the introduction of recycled activated sludge (RAS).

As depicted in FIG. 6 at 602, recycled activated sludge RAS may be introduced at 602 into the first treatment zone 128 of an orbital wastewater treatment system, separately from the influent Q. Thus when the flow from the second treatment zone 130 to the first treatment zone 128 is interrupted or blocked by the closing of gate 116, the mass of nitrates entering the first stage can be reduced. Alternatively or additionally, recycled activated sludge may be introduced at 604 into the second treatment zone 130 of an orbital wastewater treatment system. As indicated above, control unit 124 may be programmed to regulate the flow of recycled activated sludge into the first treatment zone 128 (via conduit 154 or at 602) and the second treatment zone 130 (at 604) at least partially in accordance with sensed system parameters, input exemplarily from sensors 122a, 122b.

Figure 7:
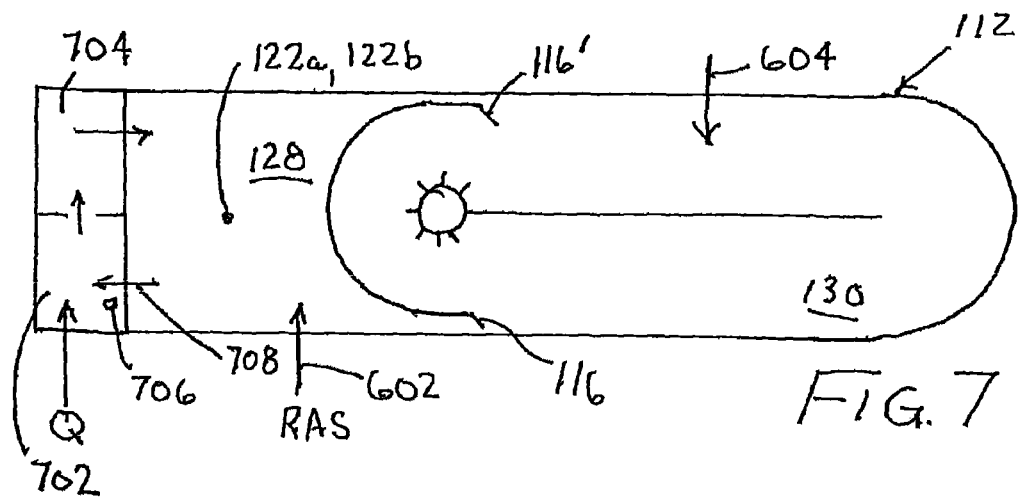
FIG. 7 is a diagram of a generic orbital wastewater treatment system in accordance with the present invention, showing alternative or supplemental locations for the introduction of recycled activated sludge (RAS) and up-front selector basins.

As illustrated in FIG. 7, a wastewater treatment system incorporating automatic flow control between treatment zones 128 and 130 may include one or more up-front selector basins 702 and 704. As discussed hereinabove, the position of gate 116 (and/or a second gate 116') is determined by control unit 124 in response to signals from at least one sensor in either treatment zone 128, 130 but preferably a sensor 122a, 122b in first treatment zone 128, in order to control the value of the parameter measured by the sensor (e.g., nitrate $NO_3$—N). This will allow, for instance, a recycling from the first treatment zone 128 to the up-front selector basins 702, 704 to be as low as possible in nitrates, thus enhancing phosphorous removal. It is to be noted that at least one sensor 706 for informing control unit 124 may be disposed in an up-front selector basin 702 or 704. Mixed liquor may be recycled from first treatment zone 128 into the one or more up-front selector basins 702 and 704 as indicated at 708.

Figure 8:
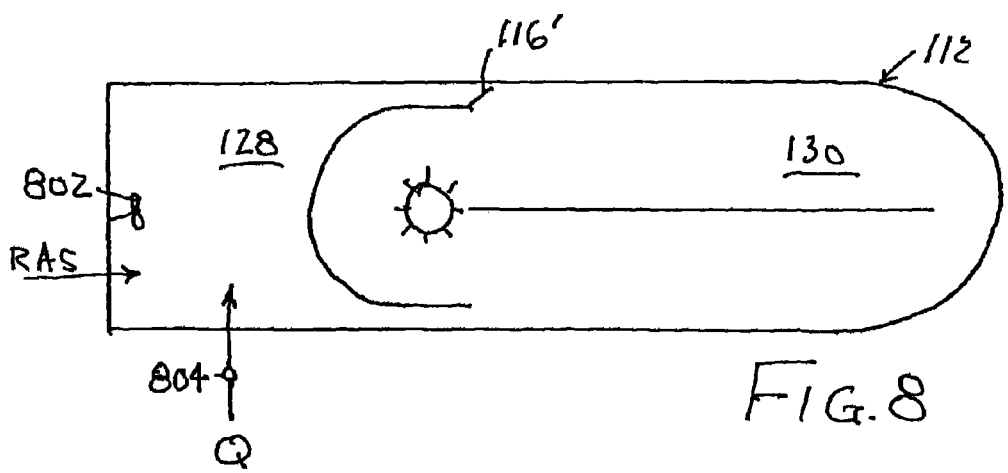
FIG. 8 is a diagram of a generic orbital wastewater treatment system for storm flow protection, showing a gate that is closed and a mixer that is shut off when a high inflow rate is detected.

FIG. 8 shows a generic orbital wastewater treatment tank 112 with a mixer 802 in the first treatment zone 128. For storm flow protection, a flow sensor 804 is disposed along flow path of the influent Q upstream of the first treatment zone 128 for detecting the inflow rate. In response to input from sensor 804, control unit 124 may deactivate mixer 802 and close gate 116' (or 116) when the flow rate exceeds a predetermined level. Where recycled activated sludge (RAS) is entering the first treatment zone 128, the deactivation of mixer 802 enables solids to settle so that the solids flux rate into the second treatment zone 130 will be reduced for some period of time, lowering MLSS in the second tratrment zone and lowering the solids loading rate on the clarifier.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An orbital wastewater treatment system comprising:
   a tank assembly having at least a first treatment zone and a second treatment zone, said tank assembly having at least two passages between said first treatment zone and said second treatment zone;
   at least one impeller in said tank assembly for moving mixed liquor under process about said tank assembly and through said passages;
   a flow-diversion mechanism at at least one of said passages;
   an actuator operatively connected to said flow-diversion mechanism;
   a control unit operatively connected to said actuator for regulating or adjusting a flow state or configuration of said flow-diversion mechanism; and
   at least one selector basin receiving influent and communicating with said first treatment zone.

2. The system defined in claim 1, further comprising at least one sensor in said at least one selector basin, said control unit being operatively connected to said sensor and said actuator for regulating or adjusting a flow state or configuration of said flow-diversion mechanism at least partially in accordance with input from said sensor.

3. An orbital wastewater treatment system comprising:
   a tank assembly having at least a first treatment zone and a second treatment zone, said tank assembly having at least two passages between said first treatment zone and said second treatment zone;
   at least one impeller in said tank assembly for moving mixed liquor under process about said tank assembly and through said passages;
   a flow-diversion mechanism at at least one of said passages;
   an actuator operatively connected to said flow-diversion mechanism;
   a control unit operatively connected to said actuator for regulating or adjusting a flow state or configuration of said flow-diversion mechanism;
   a mixer disposed in said first treatment zone; and
   at least one flow rate sensor for measuring rate of influent flow into said first treatment zone, said control unit being operatively connected to said mixer and said sensor for deactivating or stopping said mixer upon detecting an influent flow rate in excess of a predetermined level.

4. The system defined in claim 3 wherein said control unit is programmed to close said gate upon detecting an influent flow rate in excess of said predetermined level.

5. An orbital wastewater treatment system comprising:
a tank assembly having at least a first treatment zone and a second treatment zone, said tank assembly having at least two passages between said first treatment zone and said second treatment zone;
at least one impeller in said tank assembly for moving mixed liquor under process about said tank assembly and through said passages;
a flow-diversion mechanism at at least one of said passages;
an actuator operatively connected to said flow-diversion mechanism;
a control unit operatively connected to said actuator for regulating or adjusting a flow state or configuration of said flow-diversion mechanism; and
at least one input conduit extending to said tank assembly for delivering recycled activated sludge to at least one of said first treatment zone and said second treatment zone.

6. A method for operating an orbital wastewater treatment system, said system including a tank assembly with at least a first treatment zone and a second treatment zone, said tank assembly including at least two passages between said first treatment zone and said second treatment zone, said method comprising:
energizing at least one impeller in said tank assembly to move mixed liquor about said tank assembly;
automatically adjusting a flow state or configuration of a flow-diversion mechanism at at least one of said passages to modify a flow of mixed liquor between said first treatment zone and said second treatment zone;
measuring a rate of influent flow into said first treatment zone; and
deactivating or stopping a mixer in said first treatment zone upon detecting an influent flow rate in excess of a predetermined level.

7. The method defined in claim 6, further comprising closing said gate upon detecting an influent flow rate in excess of said predetermined level.

8. A method for operating an orbital wastewater treatment system, said system including a tank assembly with at least a first treatment zone and a second treatment zone, said tank assembly including at least two passages between said first treatment zone and said second treatment zone, said method comprising:
energizing at least one impeller in said tank assembly to move mixed liquor about said tank assembly;
automatically adjusting a flow state or configuration of a flow-diversion mechanism at at least one of said passages to modify a flow of mixed liquor between said first treatment zone and said second treatment zone; and
delivering recycled activated sludge to at least one of said first treatment zone and said second treatment zone,
also comprising automatically operating a sensor at a given location in said tank assembly, the delivering of recycled activated sludge being regulated at least partially in accordance with an output of said sensor.

9. A method for operating an orbital wastewater treatment system, said system including a tank assembly with at least a first treatment zone and a second treatment zone, said tank assembly including at least two passages between said first treatment zone and said second treatment zone, said method comprising:
energizing at least one impeller in said tank assembly to move mixed liquor about said tank assembly; and
automatically adjusting a flow state or configuration of a flow-diversion mechanism at at least one of said passages to modify a flow of mixed liquor between said first treatment zone and said second treatment zone, a mixer being disposed in said first treatment zone and at least one flow rate sensor being provided for measuring rate of influent flow into said first treatment zone, further comprising automatically deactivating or stopping said mixer upon detection by said flow rate sensor of an influent flow rate in excess of a predetermined level.

10. The method defined in claim 9, further comprising automatically closing said gate upon the detection by said flow rate sensor of an influent flow rate in excess of said predetermined level.

11. A kit for modifying an orbital wastewater treatment tank assembly having at least a first treatment zone and a second treatment zone and further having at least two passages extending between said first treatment zone and said second treatment zone, said kit comprising:
at least one actuator operatively connectable to a flow-diversion mechanism disposed in said tank assembly at at least one of said passages; and
a control unit operatively connectable to said actuator for adjusting or regulating a flow state or configuration of said flow-diversion mechanism.

12. The kit defined in claim 11, further comprising at least one sensor disposable in said tank assembly, said control unit being operatively connectable to said sensor and said actuator for adjusting or regulating a flow state or configuration of said flow-diversion mechanism at least partially in accordance with input from said sensor.

13. The kit defined in claim 12 wherein said control unit is programmed to adjust said flow-diversion mechanism to one of two opposed extreme states or configurations upon an earlier to occur of (i) a lapse of a predetermined time period after adjusting of said flow-diversion mechanism from said one of said two opposed extreme states or configurations and (ii) a detection by said sensor of a predetermined magnitude of a control parameter in one of said first treatment zone and said second treatment zone.

14. The kit defined in claim 11 wherein said control unit is further programmed to maintain said flow-diversion mechanism in said one of said two opposed extreme states or configurations for a predetermined additional time period and adjust said flow-diversion mechanism from said one of said two opposed extreme states or configurations after termination of said additional time period.

15. The kit defined in claim 11 wherein said control unit is further programmed to periodically adjust said flow-diversion mechanism.

16. The kit defined in claim 13 wherein said control unit is further programmed to adjust said flow-diversion mechanism from said one of said two opposed extreme states or configurations upon an earlier to occur of (i) a lapse of a predetermined additional time period after adjusting of said flow-diversion mechanism to said one of said two opposed extreme states or configurations and (ii) an automated detection of a predetermined magnitude of a preselected control parameter in one of said first treatment zone and said second treatment zone.

17. The kit defined in claim 12 wherein said sensor is taken from the group consisting of a phosphorus (P) sensor, an oxidation reduction potential (ORP) sensor, a dihydride nicotinamide adenine dinucleotide (NADH) sensor, an $NO_3$—N sensor, an ammonia ($NH_3$—N) sensor, a dissolved oxygen (DO) sensor, and a velocity sensor.

18. The kit defined in claim 12 wherein said sensor is one of a plurality of sensors connectable to said control unit, said sensors further including at least one additional sensor taken from the group consisting of a phosphorus (P) sensor, an oxidation reduction potential (ORP) sensor, a dihydride nicotinamide adenine dinucleotide (NADH) sensor, an NO₃—N sensor, an ammonia (NH₃—N) sensor, a dissolved oxygen (DO) sensor, and a velocity sensor.

19. The kit defined in claim 12 wherein said control unit is programmed to maintain said flow-diversion mechanism, upon a closing thereof, in a closed flow state or configuration for a predetermined period of time and to open said flow-diversion mechanism after termination of said period of time.

20. The kit defined in claim 11, further comprising an additional flow-diversion mechanism operatively connectable to said control unit for regulating flow of recycled activated sludge and influent to said first treatment zone at least partially in accordance with input from said sensor.

21. The kit defined in claim 11 wherein said tank assembly includes at least one impeller in said second treatment zone and at least one mixer in said first treatment zone, said control unit being connectable to said mixer for altering an operating state thereof at least partially in accordance with the flow state or configuration of said flow-diversion mechanism or changes in a sensed process parameter.

22. The kit defined in claim 11, further comprising at least one flow rate sensor disposable in an influent fee path extending to said first treatment zone, said control unit being operatively connectable to said flow rate sensor, said actuator and a mixer disposed in said first treatment zone, for operating said flow-diversion mechanism to close off flow between said first treatment zone and said second treatment zone and for deactivating said mixer upon detection by said flow rate sensor of an influent flow rate in excess of a predetermined level.

23. An orbital wastewater treatment system comprising:
a tank assembly having at least a first treatment zone and a second treatment zone, said tank assembly having at least two passages between said first treatment zone and said second treatment zone;
at least one impeller for moving mixed liquor under process about said tank assembly and through said passages;
a flow-diversion mechanism at at least one of said passages;
an actuator operatively connected to said flow-diversion mechanism; and
a control unit operatively connected to said actuator for adjusting a flow state or configuration of said flow diversion mechanism.

24. The system defined in claim 23, further comprising aeration componentry for aerating mixed liquor moving under process about said tank.

25. The system defined in claim 24 wherein said aeration componentry includes said at least one impeller.

26. The system defined in claim 23, further comprising at least one flow rate sensor disposable in an influent fee path extending to said first treatment zone, said control unit being operatively connectable to said flow rate sensor, said actuator and a mixer disposed in said first treatment zone, for operating said flow-diversion mechanism to close off flow between said first treatment zone and said second treatment zone and for deactivating said mixer upon detection by said flow rate sensor of an influent flow rate in excess of a predetermined level.

27. A method for operating an orbital wastewater treatment system, said system including a tank assembly with at least a first treatment zone and a second treatment zone, said tank assembly including at least two passages between said first treatment zone and said second treatment zone, said method comprising:
moving mixed liquor about said tank assembly; and
automatically adjusting a flow state or configuration of a flow-diversion mechanism at at least one of said passages to modify a flow of mixed liquor between said first treatment zone and said second treatment zone.

28. The method defined in claim 27 wherein the moving said mixed liquid about said tank assembly includes energizing or operating at least one impeller.

29. The method defined in claim 28 wherein said at least one impeller is located in said second treatment zone, at least one mixer being provided in said first treatment zone, further comprising altering an operating state of said mixer at least partially in accordance with the flow state or configuration of said flow-diversion mechanism or changes in a sensed process parameter.

30. The method defined in claim 27, further comprising aerating the mixed liquor moving about said tank.

\* \* \* \* \*